Oct. 25, 1932.  C. P. WEST  1,884,444
TRANSMISSION LINE PROTECTIVE SYSTEM
Filed Dec. 5, 1929    2 Sheets-Sheet 1

INVENTOR
Charles P. West.
BY
ATTORNEY

Oct. 25, 1932.  C. P. WEST  1,884,444
TRANSMISSION LINE PROTECTIVE SYSTEM
Filed Dec. 5, 1929   2 Sheets-Sheet 2

INVENTOR
Charles P. West.
BY
ATTORNEY

Patented Oct. 25, 1932

1,884,444

UNITED STATES PATENT OFFICE

CHARLES P. WEST, OF EDGEWOOD, PENNSYLVANIA, ASSIGNOR TO WESTINGHOUSE ELECTRIC & MANUFACTURING COMPANY, A CORPORATION OF PENNSYLVANIA

TRANSMISSION LINE PROTECTIVE SYSTEM

Application filed December 5, 1929. Serial No. 411,946.

My invention relates to relay protective means for transmission systems and more particularly to efficient and inexpensive means for isolating a single-phase transmission line upon the occurrence of ground-fault conditions.

Single-phase transmission systems are used extensively for railroad electrification, and the problem of minimizing the cost of protective apparatus for such systems is at once apparent.

Heretofore, protection has been provided by means of relays energized from high-potential transformers connected to the single-phase system.

The usual transmission system and protective means therefor consists of a generating station for supplying the system with a high voltage through step-up transformers and step-down or substation transformers associated with the system at regular intervals for supplying power to a railway circuit. The common practice for providing protection for the transmission system is to ground the mid-point of the high-voltage winding of the substation transformers through potential transformers; the mid-point of the step-up transformer being grounded through a resistor, and to energize relays in accordance with the voltage conditions between the system and ground.

The above described protective system operates to isolate the line on the occurrence of a fault by opening the low-voltage sides of all of the transformers connected thereto. This scheme does not require the use of high-voltage breakers but it does require a high-potential transformer and a lightning arrester at each of the substations.

The cost of these high-potential transformers and the lightning arresters necessitated thereby is high, and the further requirement that the transformers shall have mid-point taps on their primary windings precludes the use of standard transformers.

It is an object of my invention, therefore, to provide a simple and inexpensive protective system for single-phase transmission lines.

Another object of my invention is to eliminate the necessity of using high-potential transformers in a protective system for a single-phase transmission line.

Another object of my invention is to provide a protective means which shall obviate the necessity of employing lightning arresters to protect the devices connected to the mid-point taps of the transformers.

Another object of my invention is to provide a protective system whereby standard step-down transformers may be utilized for single-phase transmission-line substation service.

Further objects of my invention will become apparent in the following description of the drawings wherein.

In connecting substation transformers to high-voltage transmission systems, it is necessary to insulate the transformers from the high-voltage and this is usually done by means of bushing insulators. The use of a condenser bushing for this purpose has proved to be highly satisfactory from a commercial standpoint, and it is the purpose of my invention to associate relay means with condenser bushings and thereby provide a simplified protective system.

The condenser bushing is constructed of concentric metal-foil cylinders about the high-voltage conductor alternating with micarta or other suitable dielectric. The bushing may be considered as being a series of condensers connected from the high-voltage to ground and is usually designed for a voltage drop of about 4,000 volts per layer.

In the copending applications, Serial Nos. 227,449 and 269,460, assigned to the Westinghouse Electric & Manufacturing Company, the idea of adding a tap to the last step to ground of the condenser bushing and thereby obtaining a potentiometer is disclosed. In my invention, I utilize the potentiometer method just mentioned for energizing relay means in accordance with the transmission line conditions.

By placing a tap on the last step of the bushing and completing the circuit to ground, a voltage proportional to the line voltage may be obtained. Because of the high-voltage drop per layer of the bushing, a small potential transformer is utilized to step this voltage down to a value of about 100 volts. The small transformer is energized by the charging current of the bushing, which varies in direct proportion to the voltage applied between the conductor through the bushing and ground.

Figure 1:
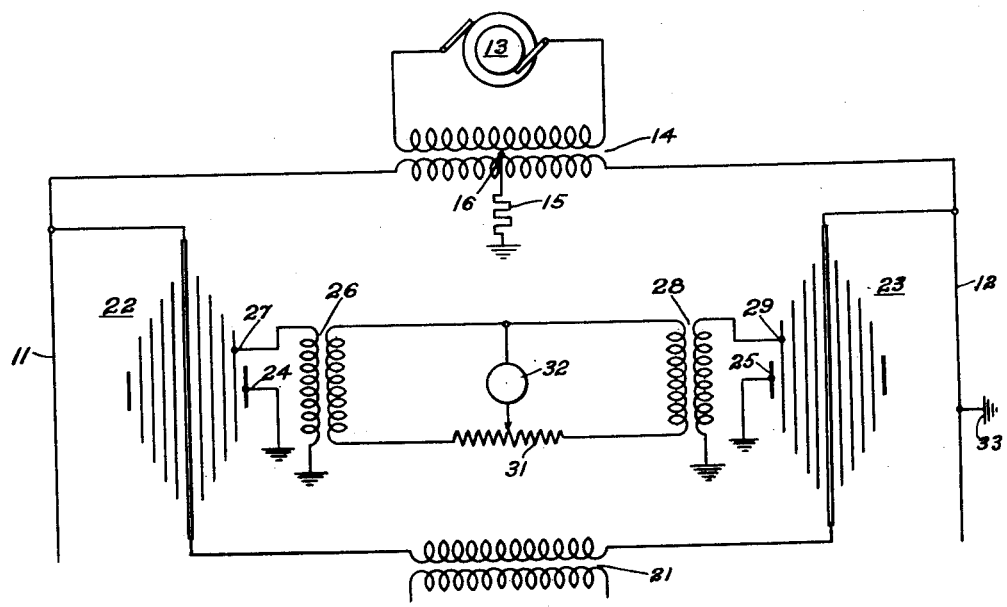
Figure 1 is a wiring diagram of my invention, as applied to a single-phase transmission line.

Referring more particularly to Fig. 1, a single-phase transmission system, having the lines thereof indicated by 11 and 12, is connected to a generator 13 through a high-voltage transformer 14. The secondary or high-voltage side of the transformer 14 has its mid-point 16 grounded through a resistance 15, thus insuring that the voltage of the two lines 11 and 12 shall be of equal magnitude above ground or neutral.

A substation transformer 21 is connected across the single-phase transmission system through condenser bushings 22 and 23 and is adapted to supply a feeder voltage to single-phase system, not shown.

For the further description of my invention, it will be assumed that the condenser bushings are placed in a metal tank, as is customary in their application to transformers. It is further possible to utilize a separate metal tank for each bushing in a manner well known to the art.

The condenser bushings 22 and 23 are grounded in the usual manner as indicated at 24 and 25, respectively. The ground connections usually consist of a layer of steel wire wrapped around the last layer of dielectric and electrically connected to the metal tank. A small potential transformer 26 has its primary winding electrically connected between the last step 27 of the condenser bushing 22 and ground. A second small potential transformer 28 has its primary winding electrically connected between the last tap 29 of the condenser bushing 23 and ground. The ground connections of the two transformers may also be made on the metal tank. The secondary windings of the small potential transformers 26 and 28 are electrically connected through a variable resistance 31. A relay 32 is connected to the variable resistance 31, in parallel relation to the secondaries of the transformers 26 and 28, and is adapted to actuate circuit-interrupting means (not shown).

Under normal operating conditions, the voltages of the two lines 11 and 12 to neutral or ground are equal, and the resulting voltage across the potential transformers 26 and 28 are substantially equal and, since they are connected in opposition, the voltages are neutralized. The connection of the relay 32 to the resistance 31 is allowed to be varied to insure that the relay is not energized during the existence of normal conditions on the single-phase transmission line.

On the occurrence of a fault condition on one of the lines, as indicated by a ground 33 on line 12, the charging current of the bushing condenser 23 is reduced to zero, and the voltage of the transformer 28 becomes zero. An unbalance of the connected secondary circuits of the two transformers 26 and 28 results, and the relay 32 is energized to trip any suitable circuit breaker, preferably a low-voltage breaker in the secondary circuit of the substation transformer 21 (not shown).

Figure 2:
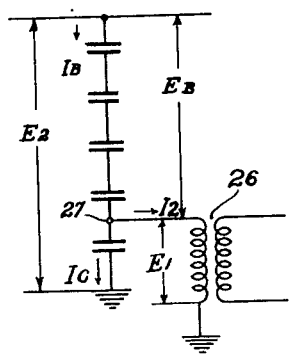
Fig. 2 is a theoretical wiring diagram showing the equivalent electrical connections of one of the condenser bushings shown in Fig. 1.

In Fig. 2, I have shown a schematic diagram of the condenser bushing 22, represented as being equivalent to a plurality of condensers electrically connected in series relation. The potential transformer 26 is represented as being connected between the last tap of the condenser bushing and ground. The line voltage $E_2$ is impressed across the series-connected condensers, and the bushing current $I_B$ is caused to flow. The line voltage $E_2$ is the sum of the voltage drop $E_B$ across the condensers above the tap 27 and the transformer voltage $E_1$. The voltage drop $E_B$ depends upon the bushing current $I_B$ which is the sum of the load current $I_2$ flowing in the transformer 26 and the charging current $I_C$ of the last step of the bushing. The equivalent bushing diagram shown in this figure is representative of all condenser bushings and is identical with the wiring diagram for bushing 23 in Fig. 1.

Figure 3:
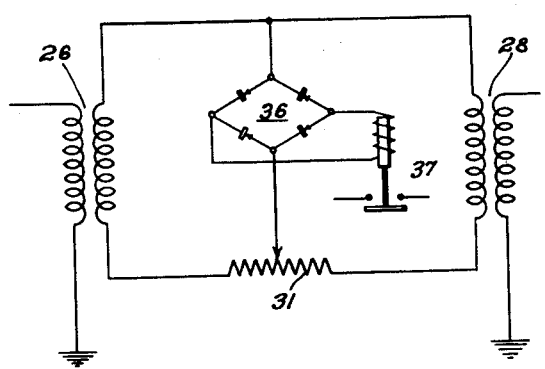
Fig. 3 is a wiring diagram of a relay means adapted to my invention.

Fig. 3 shows the small potential transformers 26 and 28 and the circuit relation of their secondary windings. A rectifying means 36 is connected in parallel relation to the secondary windings in a substantially similar manner to the connection of the relay 32 (shown in Fig. 1.)

A relay 37 is connected to the rectifying means 36, in a manner well known to the art, and is energized by a direct current, as compared with the alternating-current energization of relay 32. Since a low-energy direct-current relay is easier to build than a corresponding low-energy alternating-current relay, the use of relay 37, in conjunction with the rectifying means 36, may be preferable to the use of relay 32. However, the time of operation of the two relays is substantially the same and no appreciable difference in the operation of the associated circuit-breakers results.

Figure 4:
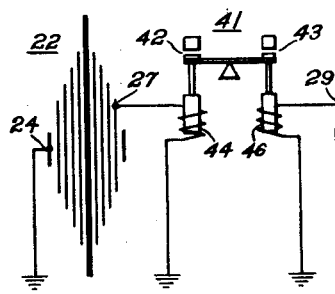
Figs. 4 to 8 are modifications of my invention utilizing a balanced differential relay.

Fig. 4 is a modification of my invention wherein only the specific connections of the relay means to the condenser bushings are shown. The condenser bushings 22 and 23 are grounded in the usual manner, as indicated at 24 and 25, respectively. A differential relay 41, having contacts 42 and 43, is electrically connected to the last steps 27 and 29 of the respective bushings 22 and 23. One solenoid 44 of the relay 41 is energized by the charging current of bushing 22; the circuit thereof being from the last step 27 of bushing 22, through the solenoid 44, to ground. The other solenoid 46 of the relay 41 is energized in accordance with the charging current of bushing 23 and is in series-circuit relation to the last step 29 of the bushing 23 and ground.

Under normal operating conditions, the charging currents of the two condenser bushings 22 and 23 are equal, and the two solenoids 44 and 46 are energized equally. The relay 41, therefore, is normally energized, and neither of the contacts 42 and 43 is actuated. Should faulty conditions occur, resulting in an unbalance of the charging currents of the respective bushings 22 and 23, the energization of the solenoids 44 and 46 would be no longer equal, and the contacts 42 and 43 of the relay 41 would be actuated to effect the completion of any suitable control circuit. The contacts 42 will be actuated for a fault occurring on the line to which the condenser bushing 22 is connected, and the contacts 43 will be actuated on the occurrence of a fault on the line to which the condenser bushing 23 is connected.

Figure 5:
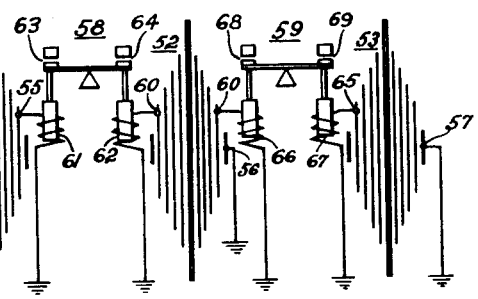

Fig. 5 is a modification of my invention, as applied to a three-phase grounded-neutral system. The condenser bushings 51, 52 and 53 are connected to the respective phases of a three-phase system (not shown), and the bushings are grounded in the usual manner, as indicated at 54, 56 and 57, respectively. Differential relays 58 and 59 are actuated in accordance with fault conditions occurring on the three-phase system to cause the operation of any desired circuit breakers (not shown). A solenoid 61 of the relay 58 is electrically energized from the last tap 55 of the bushing 51 to ground. A balancing solenoid 62 of the relay 58 is energized from the last step 60 of the bushing 52 to ground. The contacts 63 and 64 of the relay 58 are open during the existence of normal conditions on the three-phase system. The differential relay 59 has its solenoid windings 66 and 67 energized from the last steps 60 and 65 of the respective bushings 52 and 53; the respective energizing circuits being completed to ground. The contacts 68 and 69 of the relay 59 are normally in an open position and are actuated only to control the operation of suitable circuit-breakers upon the occurrence of faulty conditions in the system. The relays 58 and 59 may be connected to the same or to different circuit breakers to provide full protection for the system.

For a fault on the phase to which the condenser bushing 51 is connected, the charging current of the bushing will become zero, and the relay 58 will be actuated to close its contacts 63. For a fault on the phase to which the condenser bushing 52 is connected, the charging current of the bushing becomes zero, and the relays 58 and 59 are actuated to close their contacts 64 and 68, respectively. For a fault on the phase to which the condenser bushing 53 is connected, the charging current of the bushing becomes zero, and the relay 59 is actuated to close its contacts 69. Either one or both of the relays 58 and 59 will be actuated for different ground faults occurring upon the three-phase system while, for line-to-line faults or simultaneous ground faults occurring on all of the lines of the system, none of the relays will be actuated.

Figure 6:
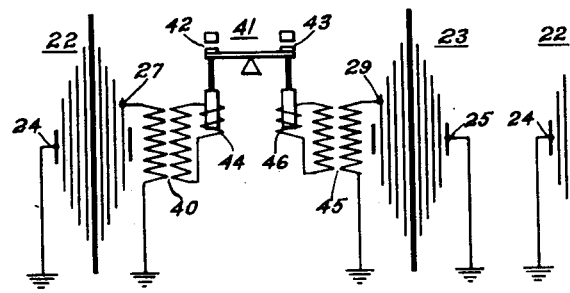

Fig. 6 is a modification of the scheme shown in Fig. 4, wherein potential transformers are utilized to energize the solenoid windings of a differential relay. The primary windings of the respective transformers 40 and 45 are electrically connected from the last steps 27 and 29 of the respective bushings 22 and 23 to ground. The secondaries of the transformers 40 and 45 respectively energize the respective solenoid windings 44 and 46 of the relay 41. The actuation and operation of relay 41 is substantially the same as that of the relay 41 in Fig. 4.

Figure 7:
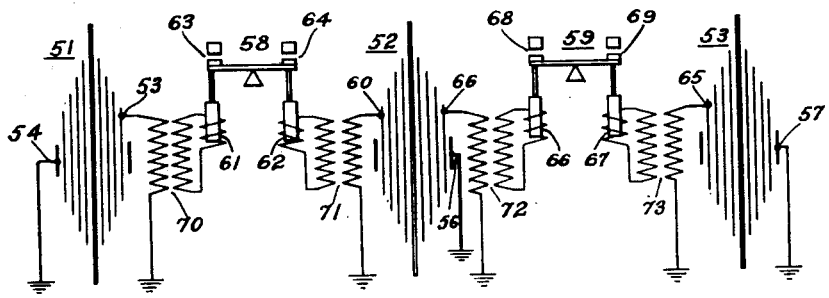

Fig. 7 is a modification of the scheme shown in Fig. 5 wherein potential transformers are used to energize the solenoids of the relays in accordance with the respective charging currents of the condenser bushings. The primary windings of the potential transformers 70 and 71 are respectively energized in accordance with the charging current of the respective condenser bushings 51 and 52. The secondary windings of the said transformers energize the solenoids 61 and 62, respectively, of the relay 58. In a similar manner, the potential transformers 72 and 73 are energized in accordance with the charging current of the respective condenser bushings 52 and 53, and the solenoids 66 and 67 respectively of the relay 54 are energized by the secondary windings of the transformers 72 and 73, respectively. The operation of the relays 58 and 59 is substantially the same as the operation of the corresponding relays shown in Fig. 5.

Figure 8:
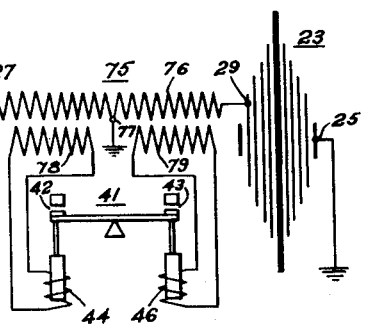

Fig. 8 is a further modification of my invention wherein a single potential transformer having two secondary windings is utilized. This scheme is similar to that shown in Fig. 6 and differs therefrom only in the use of a single potential transformer.

Condenser bushings 22 and 23 are energized from a single-phase line (not shown) and are grounded in the usual manner at 24 and 25, respectively. The primary winding 76 of a potential transformer 75 is electrically connected to the last taps 27 and 29 of the bushings 22 and 23, respectively. The primary winding 76 has its mid-point grounded at 77, thereby insuring that a balanced condition exists between the two condeser bushings 22 and 23. The potential transformer 75 has two secondary windings 78 and 79 and, since the mid-point 77 of the primary winding 76 is grounded, the secondary windings are equally energized. A differential relay 41, having opposing solenoid windings 44 and 46, is adapted to close either its contacts 42 or its contacts 43. The solenoid winding 44 is energized by the secondary winding 78, and the solenoid winding 46 is energized by the secondary winding 79.

Under normal conditions, the solenoid windings 44 and 46 of the relay 41 are equally energized, and the contacts 42 and 43 are in open position. However, in the event of a fault occurring on the line to which the bushing 22 is connected, the charging current of the bushing becomes zero, and the relay 41 is actuated to close its contacts 42. In a similar manner, the occurrence of fault conditions on the line to which the condenser bushing 23 is connected, will cause the relay 41 to close its contacts 43.

My invention has a wide field of application in railway electrification and the embodiment thereof, as shown in Fig. 1, is not to be construed as limiting the scope to a protective means for a single substation. The relay means may be arranged to trip a circuit-breaker associated with the main transmission system or to trip a low-voltage breaker associated with the substation circuit. The latter arrangement would be cheaper from an installation point of view because of the use of low-voltage breakers.

In the modifications of my invention utilizing a differential relay means (Figs. 4–8), a sensitive means is provided for detecting high or low resistance grounds and the application of my invention to both single-phase and three-phase grounded neutral systems, provides a simple inexpensive protective means therefor.

In eliminating the necessity for high-potential transformers, lightning arresters and special tapped substation transformers, the installation and operating cost of a transmission line provided with my protective system is greatly reduced, and it is possible to provide a better design of substation transformer.

I do not wish my invention to be limited otherwise than as required by the prior art and as indicated in the appended claims.

I claim as my invention:

1. In a transmission system, a plurality of conductors comprising a transmission circuit, means for grounding a neutral point of said circuit, a plurality of capacitance devices connected between said conductors and ground, each of said capacitance devices comprising a series of alternatively disposed conducting elements and dielectric elements, protective relay means, and means responsive to the voltages across a part of each of a plurality of said capacitance devices for operating said protective means upon the occurrence of a ground fault upon said circuit, whereby said circuit may be protected against ground faults although conductively grounded at only one point.

2. In a transmission system, a plurality of line conductors comprising a transmission circuit, means for grounding a neutral point of said circuit, a plurality of condenser bushings associated with said circuit, each of said bushings comprising an inner conductor connected to a corresponding line conductor, an outer grounded conducting element and insulated intermediate conducting elements disposed between said inner conductor and said outer element, and protective relay means responsive to the voltages between pairs of said conducting elements of a plurality of said bushings, whereby said protective means may be operated in response to ground faults of said circuit although said circuit is conductively grounded at only one point.

3. In a transmission system, a plurality of line conductors comprising a transmission circuit, means for grounding the neutral point of said circuit at the supply end, a plurality of condenser bushings associated with said circuit at a distribution point, each of said bushings comprising an inner conductor connected to a corresponding line conductor, an outer grounded conducting element and insulated intermediate conducting elements disposed between said inner conductor and said outer element, and protective relay means responsive to the voltages between pairs of said conducting elements of a plurality of said bushings, whereby said protective means may be operated in response to ground faults of said circuit, and a conductive connection of said circuit to ground at said distribution point may be avoided.

4. In a transmission system, a plurality of line conductors comprising a transmission circuit, means for grounding the neutral point of said circuit at the supply end, a plurality of condenser bushings associated with said circuit at a distribution point, each of said bushings comprising an inner conductor connected to a corresponding line conductor, an outer grounded conducting element and insulated intermediate conducting elements disposed between said inner conductor and said outer element, protective relay means, and means responsive to the voltages between corresponding intermediate elements of a plurality of said bushings and ground, for operating said protective means upon the occurrence of a ground fault upon said circuit, whereby a conductive connection of said circuit to ground at said distribution point may be avoided.

5. In a transmission system, a plurality of line conductors comprising a high-tension circuit, means for grounding the neutral point of said circuit at the supply end, a plurality of condenser bushings associated with said circuit at a distribution point, each of said bushings comprising an inner conductor connected to a corresponding line conductor, an outer grounded conducting element and intermediate insulated conducting elements disposed between said inner conductor and said outer element, a distribution transformer winding connected to said inner conductors, protective relay means, and means responsive to the voltages between corresponding intermediate elements of a plurality of said bushings and ground, for operating said protective means upon the occurrence of a ground fault upon said circuit, whereby a conductive connection of said winding to ground may be avoided.

In testimony whereof, I have hereunto subscribed my name this 21st day of November, 1929.

CHARLES P. WEST.